May 17, 1966 — L. E. WALKUP — 3,251,706
XEROGRAPHIC DEVELOPMENT METHOD AND APPARATUS
Filed Jan. 4, 1954
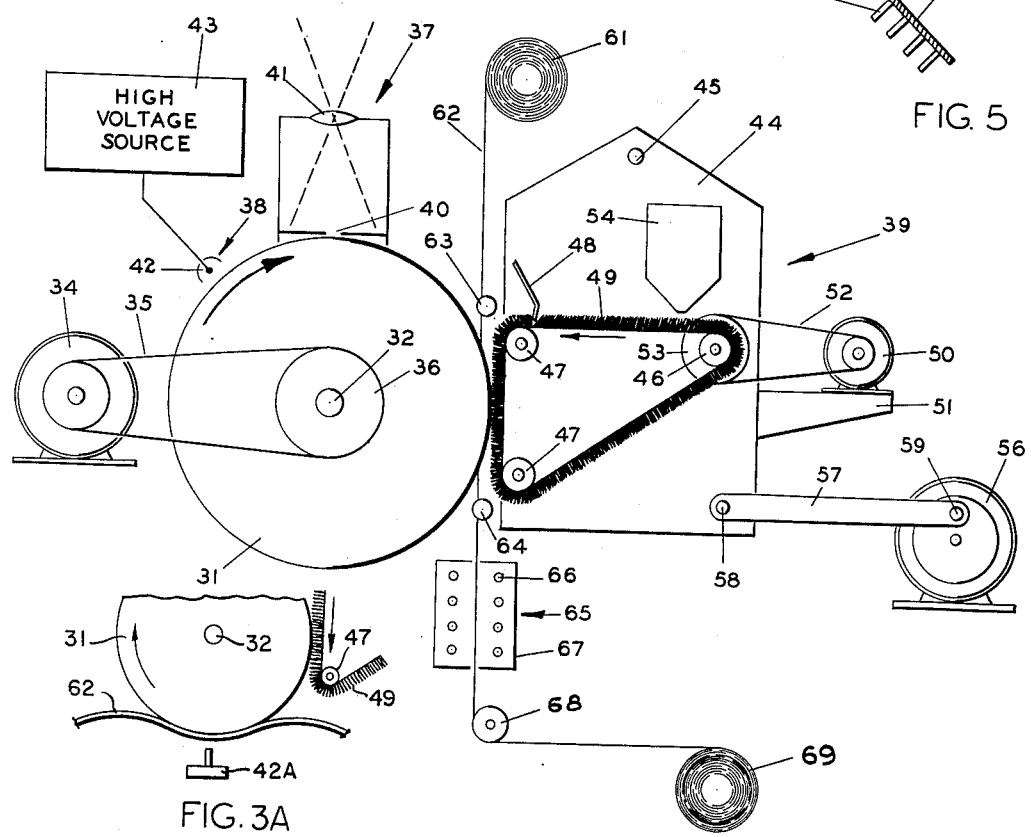
INVENTOR.
LEWIS E. WALKUP
BY
Frank A. Steinhilper
ATTORNEY United States Patent Office 3,251,706
Patented May 17, 1966

3,251,706
XEROGRAPHIC DEVELOPMENT METHOD
AND APPARATUS
Lewis E. Walkup, Columbus, Ohio, assignor to Xerox
Corporation, Rochester, N.Y., a corporation of New
York
Filed Jan. 4, 1954, Ser. No. 401,811
12 Claims. (Cl. 117—17.5)

This invention relates in general to the electrostatic deposition of finely divided materials, and in particular to the electrostatic deposition of powder materials for purposes such as, for example, the development of a xerographic image.

In xerography and related arts, it is usual to deposit an image such as a powder image on an electrostatic charge pattern conforming to a pattern of light and shadow which is to be recorded or reproduced. For example, an electrostatic charge pattern known to the art as a xerographic electrostatic latent image, corresponding to a document, picture, or other image, is formed on an image-bearing, insulating surface. One means of utilizing the electrostatic latent image is by development with a finely divided powder material which is caused to adhere to the surface in configuration corresponding to the electrostatic image. In the past, the most commonly used procedure for the development of such a xerographic latent image has been cascading across an image-bearing surface a two-component developer mixture such as is disclosed in U.S. Patent 2,618,551. This prior method offers many advantages but at the same time is subject to some difficulties in operation, particularly in necessary mechanical features.

Now, in accordance with the present invention, there is provided a new method, apparatus and mechanism for the deposition of a powder image corresponding to an electrostatic charge pattern, wherein finely divided powder is deposited on the charge pattern from an elongated flexible carrier body such as, for example, a fibrous member.

It is an object of the present invention to provide new apparatus for the deposition of a powder image in conformity with an electrostatic latent image, wherein powder is carried on a supported body which supported body in turn is carried by one end past the image surface to brush or bear against the surface.

It is another object of the invention to provide new development apparatus for the development of xerographic latent images.

It is a further object of the invention to provide development apparatus for the development of a xerographic image wherein a powder image is deposited from a fiber or brush-like member.

It is a still further object of the invention to provide a new method for the deposition of a powder image on the electrostatic latent image such as is formed in xerography or the like.

It is still another object of the invention to provide a new apparatus, method and means for the development of xerographic electrostatic latent images.

Additional objects of the invention will in part be obvious and will in part become apparent from the following specification and drawings in which:

FIG. 1 is a diagrammatic view of one embodiment of the invention;

FIG. 2 is a diagrammatic view of a second mechanized embodiment of the invention;

FIG. 3 is a diagrammatic view of a xerographic machine according to one embodiment of this invention;

FIG. 3A is a diagrammatic view of a powder image transfer station that may be employed with a xerographic machine similar to the type shown in FIG. 3, but wherein the powder image is formed directly on the xerographic cylinder.

FIG. 4 is a front elevation of a striking plate according to one embodiment of the invention; and FIG. 5 is a side cross section of the member of FIG. 4, taken along line 5—5.

In FIG. 1 there is disclosed a diagrammatic illustration of the deposition of powder image on an image-bearing surface. As illustrated in this view, an image-bearing surface 10 bears an electrostatic latent image or charge pattern as indicated diagrammatically by the plus marks on the surface. This image-bearing surface may, for example, be a xerographic plate bearing an image which has been formed by charging and exposure as in conventional xerographic procedures, or it may be such other insulating surface on which an electrostatic charge pattern may be produced or to which such electrostatic charge pattern may have been transferred by means as will be known to those skilled in the art. It generally will be an insulating surface which, under the conditions of operation, is capable of bearing and retaining on its surface an electrostatic charge pattern having an extremely fine resolution, optionally corresponding to a reproduction of a document, manuscript, or the like, or a reproduction of a visual scene such as in a photograph or other photograph reproduction. Positioned above the image-bearing surface 10 is a powder deposition member generally designated 11 which may, for example, comprise a fibrous member 12 such as a brush, optionally having control means 13 such as a handle or other drive or control means adapted to move the brush-like member 12 across the image-bearing surface. The powder deposition member 11 is provided with elongated flexible carrier members supported at one end and free at the other end and positioned to brush against the image-bearing surface, such carrier members, for example, being fibers of the brush or other fibrous material or similar elongated members adapted and disposed to hold on their surface by electrostatic action suitably charged powder particles which are appropriate for the deposition on and development of an electrostatic latent image.

It is to be understood that the electrostatic image which is being developed such as, for example, a xerographic electrostatic latent image or the like is composed of image areas of varying charge, whether such image areas be of positive or negative polarity. For example, as illustrated in FIG. 1, there may be areas of positive charge interspaced by areas of virtually no charge and it is to be realized that it is within the scope of the invention to substitute negatively charged image areas or image and background areas of either positive or negative charge in which the image is delineated by areas of varying charge or potential.

As conventionally used in xerography, the image member 10 may be the surface of a photoconductive insulating xerographic plate on which is an image of positive polarity electrostatic charge, consisting of charged image areas and substantially discharged background areas, on which it is desired to deposit powder conforming with the electrostatic image. Such an image may be produced by uniformly charging the surface of a photoconductive insulating layer overlying a conductive backing member, and exposing the layer to a pattern of activating radiation to cause selective dissipation of the charge in the light areas. In such a case the image may be developed or made visible with a finely divided powder which may appropriately be selected according to the desired characteristics. One satisfactory powder composition is a pigmented thermoplastic resin such as a modified phenol-formaldehyde resin as disclosed in U.S. Patent 2,659,670, and it is to be understood that other satisfactory materials may be employed. Suitable materials may be considered to be those powder materials which are clearly visible against the background of the surface used such as, for example, the surface of paper or the like, and which powder materials can be charged by frictional electrification with the fibers of the brush or other developing member, being charged thereby to a polarity opposite to the polarity of the charge on the electrostatic latent image. Various pigmented resins and pigment materials are satisfactory for this purpose. Thus, for example, satisfactory images have been prepared using a camel's-hair brush as the development member and a commercial xerographic developing composition consisting of pigmented rosin-modified phenol-formaldehyde resin powder and available under the name "XeroX Toner."

Illustrated in FIG. 1 is a partially developed xerographic image in which the charged areas of the electrostatic latent image are receiving the deposited image body 15 of developer material from the developing device 11. This image body conforming to the electrostatic latent image can be utilized by various methods such as transfer to a suitable print support member such as paper or the like to form a finished xerographic print according to conventional transfer and fixing methods. The resulting print is of high quality and achieves a resolution in the order of about 20 lines per millimeter or better, which resolution compares favorably with the resolution achieved by cascade type of development. Speed of development is extremely rapid and is accomplished substantially instantaneously upon touching the development member to the appropriate image surface. It is presently understood and believed that the mechanism of the development is generally as follows. A powder-impregnated brush-like member is prepared by brushing a camel's-hair brush or the like into a supply of the appropriate powder whereupon the powder adheres to the elongated carrier body, apparently by electrical attraction from frictionally generated electricity. Using a camel's - hair brush and XeroX Toner, the powder has been found to be charged negatively and the brush fiber to be charged positively. When the powder impregnated brush is touched to the image-bearing surface, the positive polarity charge in the image surface preferentially attracts the negatively charged powder from the brush fibers causing deposition of the powder on the image areas. In the background areas there exists no such preferential attraction between the powder and the image-bearing surface and therefore the background areas are maintained substantially free from powder deposit. In this sense, therefore, the invention comprises apparatus means and methods for the deposition of powder on an image surface by presenting to the image surface an elongated carrier body having on its surface electrostatically adhering particles of a developing powder composition.

In FIG. 2 is shown a xerographic plate generally designated 17 comprising a photoconductive insulating layer 18 on a conductive backing member 16, said photoconductive layer bearing a xerographic electrostatic latent image as indicated by the plus marks on the surface. Disposed over this surface is a transfer member 19 comprising a sheet or web of paper or other suitable transfer surface which may if desired be a sheet or web of paper, cloth, plastic or other film-like material. Disposed above or behind the transfer member 19 is a brush 20 having brush fibers around its surface. A powder reservoir 22 containing a mass of powder particles 12 is disposed to dispense this toner or powder onto the brush 20. A grounded metallic striking plate 23 contacts the brush between the powder reservoir and the transfer member.

In operation, the brush is located to pick up powder from this powder reservoir 22 and transport it to the upper or back side of the member 19. In this situation, the powder is deposited as an image body 15 (see FIG. 2) on the surface of the transfer web 19 under the influence of the electrostatic field associated with the electrostatic image on the xerographic plate 17. Upon moving the plate and transfer web with relation to the developing brush 20 while rotating the brush past the powder dispensing reservoir 22 and into contact with the transfer web 19, there is formed a developed xerographic image consisting of deposited powder conforming with the electrostatic image on the xerographic plate. The transfer web 19 then is removed from the xerographic plate and the powder image is made permanent by vapor or by heat fusing or the like.

Several types of mechanical application have been investigated for presenting the powder bearing fiber or like member to the image surface. These are, in general: dabbing, or a gentle up-and-down motion; stroking; or brushing the image surface with relatively long strokes; stroking in a circular motion; stippling, or a rapid downward stroke similar to the action used in stippling paint. The various mechanical actions produce different results which are preferable for different purposes, and there is no one motion best suited for all needs. In general, however, the two methods found most suitable are stippling and brushing, each for its own type of work. For example, in the embodiment shown in FIG. 1, where powder is applied directly to the electric image surface, stroking generally gives better results in terms of image sharpness and clarity and absence of powder deposits in background areas. On the other hand, for the embodiment of FIG. 2, where powder is deposited on a surface overlying the electric image surface, stippling generally is preferred. For this embodiment, it is distinctly advantageous that development occurs mainly at the bottom of the stroke where the brush-like member has brought the paper or other powder receiving member into close contact with the image surface. Among other things, this has the advantage of permitting a small spacing to be maintained between the paper and the electric image surface at all times except during the actual moment of development, thus minimizing lateral conductivity of the paper or other powder receiving sheet or web.

It has been found that the striking plate 23 or its equivalent serves a significant purpose in improving the quality and appearance of the developed image. It is not intended to limit the invention to a theory of operation, but it is thought that an explanation of the action of the striking plate according to present understanding will be of value. The act of development in xerography is the deposition of finely divided particles by means of electrostatic attraction, and such deposition calls for charged particles. It is, therefore, necessary to provide charged particles which can be accomplished in many ways, including to a degree, simple contact charging by the brush in picking up powder particles. Adequate charging of the particles does occur in this manner. However, greater uniformity of charging is desirable for best results, and for this purpose the striking plate has been found quite effective. It is thought that the brush like member picks up a deposit of particles, mostly charged and held to the fibers by electrostatic forces, but some not substantially charged, or even charged to a polarity opposite to the average and held to the brush mechanically or by means other than triboelectrically generated forces. When the powder laden brush now hits the striking plate it is understood that substantially all the powder is electrically charged by contact with either the brush fibers, the striking plate, or both, and the uncharged particles are shaken free from the brush. Desirably there should be a great deal more friction than needed for brush rotation, resulting in high frictional charging of the powder. Thus, the brush, belt, or other brush-like development member presents to the image surface a body of powder particles charged homogeneously to the proper polarity for deposition, and the striking plate has been found experimentally and should logically contribute to this result. Control of the degree of striking or agitation affords also control of concentration of powder held on the brush.

The choice of brush-like member is known to be a very wide choice, and yet it is equally plain that certain materials have clear preference over others. In the first place there are many mechanical properties which direct the choice. For example, the fiber, brush, or like material should be soft and flexible so that while supported at one end it can be brushed against the image without undue abrasion. Thus, either easy flexibility or softness is essential and both are desirable. A next characteristic of vital significance is the correct triboelectrical relationship with the powder or toner. For this point it is noted that a very few select powder materials are suitable as developing powders and that it is generally desired to charge these powders negatively by contact electrification for deposition on a positive polarity image. Other properties of the brush-like member are absence of film forming or scum forming ingredients and particularly electrically conductive ingredients, suitable durability, chemical inertness and economic availability.

In view of a balance of many desirable properties and characteristics several animal furs and synthetic brush materials have been investigated, and these have proven satisfactory in most ways. Generally they are soft, non abrasive, flexible, inert, and free from deleterious ingredients and components. With the exception of certain notoriously expensive animal furs they are economically available. To test the triboelectric relationship toward a desirable powder, about 0.05 gram of powder saturated fur was placed in a metal cage and the powder removed by an air blast. A measurement of polarity and amount of charge removed from the metal cage by the escaping toner can be determined by a direct electrical measurement on the cage and indicates the relative charging effectiveness of the fur. The figure is not quantitative since magnitude of charge is not now known to be the key requirement, but the electrical measurement is a guide toward material selection. For a pigmented rosin-modified phenol-formaldehyde resin powder available under the name XeroX Toner, the following measures were noted:

Table 1

| Sample: | Microcoulombs/gms. of Toner |
|---|---|
| New Zealand rabbit | +5.7 |
| Domestic rabbit | +12.7 |
| Russian fox | +10.2 |
| Domestic fox | +13.7 |
| Camel hair | +13.3 |
| E-180 alpaca | +15.1 |
| CF 740 nylon acrila | +5.9 |
| CF 622 Dynel | −2.4 |
| Lofty Toy Brown | +15.7 |

It is observed that of the materials listed in Table 1 only Dynel (a synthetic fiber of 40% acrylonitrile and 60% vinyl chloride) charged the powder positively and the other provided negatively charged powder for photographically positive reproduction of an electrically positively charged image. It is also to be noted at this point that metals in general charge powders negatively so that like results can be achieved with a metal of suitable flexibility and softness.

Where development is carried out on a film such as a sheet or web of paper or the like overlying the image-bearing surface, the principal criterion will be suitability as a print support surface. This includes color, texture, finish and the like. In addition, desirable properties are smoothness of the surface so as to encourage powder deposition only in response to the electrostatic image being developed and absence of conductivity so as to avoid discharging the image. Thin paper is desirable because of general cheapness of paper and because thinness is consistent with better image development. Transparent films are useful in making transparencies for projection purposes and because of smoothness of usual transparent films. These and like considerations, generally practical considerations, will generally influence the choice among many suitable materials. Desirably, if paper is the sheet or web on which development occurs, the paper should be baked prior to use or otherwise treated to remove moisture or other cause of electrical conductivity.

In FIG. 3 is shown a xerographic machine employing one embodiment of the present invention. This machine is adapted and disposed to operate to produce a completed xerographic print upon exposing photosensitive member to an appropriate light or image source. The photosensitive member, according to this embodiment of the invention, is a cylinder 31 rotatably mounted on an axle 32 and adapted to be driven by a motor 34 operating through belt 35 to rotate a drive pulley 36 which is integrally attached to the cylinder. The surface of cylinder 31, or, alternatively, selected portions of such surface, is a xerographic photosensitive surface comprising conventionally a photoconductive insulating layer disposed over a conductive support backing member. Such xerographic photosensitive members are well known to the art and an appropriate member may be selected from materials and members which are familiar to those skilled in the art.

Disposed around the circumference of the cylinder are suitable xerographic stations such as a charging station 38, an exposure station 37, and a developing station 39 according to the present invention. The xerographic cycle of continuously operating devices and processes may be considered as starting at the charging station 38 which is adapted to place on the surface of the xerographic member a uniform electrostatic charge whereby the photosensitive member is presensitized for operation according to xerography. This charging station may comprise a suitable corona discharge electrode consisting of one or more fine conductive wires held at a high voltage to generate corona discharge in the vicinity of the wires. Desirably, the conductive strands are at least partially shielded. As illustrated in the drawing, the corona discharge wires 42 are operably connected to a high voltage source 43 which optionally may be of positive polarity to impart positive electrostatic charge to the surface of the xerographic cylinder 31. It will be understood that other charging or sensitizing means such as conductive or inductive charging methods, as may be known or become known to the art, may be substituted for the corona discharge charging means, specifically disclosed. The exposure station 37 in general comprises an exposure member such as a projection lens 41 mounted to project an image to be recorded onto the surface of cylinder 31 preferably through an exposure slit 40. As desired, this may be any conventional exposure member such as a fixed focus or variable focus lens, a slit projection device or the like, and the operation of the present invention is not restricted to a particular type of exposure member. It is to be understood likewise that contact exposure devices may be employed in conjunction with cylinder 31 and the ultimate purpose of the exposure member is to direct to the surface of the cylinder an image of activating radiation in a pattern to be recorded by the xerographic machine.

Next, subsequent to the exposure station in the direction of rotation, as indicated by the arrow, is the development station 39. As illustrated diagrammatically in FIG. 3 this development station in the entirety is mounted on a support plate 44 which is pivotally supported on a pivot pin 45, whereby the entire developer assembly may be oscillated against and away from the xerographic cylinder 31. Mounted on support plate 44 is a drive roller 46 and one or more guide rollers 47 around which is passed a developing belt 49. A striking plate 48 is mounted to strike the brush fibers prior to their meeting the image surface. The striking plate is generally metallic and is electrically grounded. It is thought that the powder-bearing brush striking against the metal plate causes charging of the powder. The outer surface of this developing belt is brush-like in characteristics and has a multitude of elongated carrier members such as cloth or brush fibers extending outwardly from the surface of the belt. The carrier members may be regarded as analogous to the fibers 12 of the brush in FIG. 1. In general, this member may be a brush-like surface of fur or the like, cloth such as particularly velvet-like cloth having a fibrous surface, a web-like surface having elongated members or fibers extending therefrom, or other support surface bearing a multiplicity of elongated carrier members on its surface.

At least one of the rollers such as, for example, roller 46 is desirably power driven as illustrated by member 50 mounted on support base 51 and adapted to drive roller 46 through belt 52 operating on pulley 53. Positioned adjacent to the path of the motion of developing belt 49 is a powder dispensing hopper 54 containing a supply of developer powder and adapted to dispense this developer powder gradually to the developing member 49.

A drive motor 56, operating shaft 57 which is connected to support plate 44 by pin 58, is constructed and adapted to oscillate the support plate 44 and thereby the entire developer assembly, through the drive action of cam 59 which imparts oscillating motion to shaft 57. In this manner, the developing web 49 is moved into and out of contact with the surface of xerographic cylinder 31, with much the same result as the stippling type of powder application. The oscillatory mounting of the developer assembly also assists in causing uniform dispensing of the developer from hopper 54.

If desired, a suitable transfer station, see FIG. 3A, may be disposed at the circumference of the cylinder preferably at a position near the bottom of the cylinder 31 according to the embodiment illustrated. Thus, an image can be developed on the cylinder and transferred to a transfer web 62 at such transfer station by corona electrode 42a, in the manner disclosed in Schaffert Patent 2,576,047, issued November 20, 1951. Alternatively, as illustrated in FIG. 3, a web-supply roll 61 is adapted to feed a receiving web or transfer web 62 past guide roller 63 and against the surface of cylinder 31 between the cylinder and the development web 49. After passing between these members, the transfer web 62 then passes around guide roller 64, desirably through a fixing station 65, and around a guide roller 68 to a take-up roller 69. The fixing station 65 may be a suitable means to apply heat, solvent vapor or the like to the surface of the transfer web and, as illustrated, may consist of a plurality of heating units 66 mounted within a casing 67 thereby adapted to heat the transfer web to melt onto its surface the plastic powder deposited thereon.

In FIGS. 4 and 5 is shown a striking plate that is particularly suited to one form of the invention. This plate 48 comprises a paddle member 70 having a plurality of spines 72, teeth, or the like, projecting therefrom in an irregular or staggered pattern and adapted and disposed to comb through the fibers of the brush-like developing member. A support plate 71 has mounting means 73 such as holes or the like for bolting the striking plate assembly to a suitable support frame of the entire device. The striking plate is mounted in such manner as to comb through the brush and accomplish thorough frictional contact between the fibers and the powder or between the striking plate and the powder.

In use and operation, the device and apparatus of FIG. 3 performs in accordance with the steps and operations of the devices of FIGS. 1 and 2. The surface of the xerographic photosensitive member is charged by passing under corona discharge electrode 42 and then passes to the exposure station where an image of light or other activating radiation is imposed onto the surface. This, according to conventional xerographic means and procedures, causes the formation thereon of an electrostatic latent image corresponding to a pattern of light and shadow to be recorded. It is to be understood that other means of imparting this xerographic electrostatic latent image may be employed. The image-bearing cylinder surface then passes to the development station with the transfer web 62 contiguous thereto and preferably synchronized therewith. At this point development web 49, with its brush-like surface coming into contact with the transfer web 62, deposits a finely divided powder material on the surface of the transfer web 62. The development web during this operation is desirably moving along with the surface of the drum according to the operation of guide motor 50 and at the same time is undergoing oscillating motion as the entire developer assembly oscillates toward and away from the surface of cylinder 31. In this manner a patting type of motion or, if desired, a stippling action is imparted to the development support and a patting or stippling action results between the brush-like member and the surface being developed. It is to be understood of course, that the oscillating motion and mechanism may be omitted and that the entire development action may be the simple rotation of the brush and the cylinder to impart a stroking motion.

Leaving the development station is the transfer web 62 now bearing the powder image thereon which image corresponds to the electrostatic image on the image-bearing cylinder. This image-bearing transfer web passes to a suitable fixing device 65 and then to the take-up roll or to some other means for utilizing the resulting xerographic print.

It is to be observed that cylinder 31 emerging from the development station still bears on its surface, substantially unchanged, the xerographic electrostatic latent image which had been imparted to the surface at charging and exposure stations 38 and 37. This image on the surface is adapted to be utilized through a repetition of one or more similar development stations operating according to the means and mechanisms of development station 39, either by location of additional development stations around the circumference of the drum or by recycling the drum through the same development station a plurality of times without recharging or reexposing. If desired, however, the drum surface may be again passed through the energized charging and exposure stations whereby a new electrostatic image can be placed on the sensitized surface.

Additional operating stations may be employed as needed, including for example, stations operating to fully discharge the surface of cylinder 31 or to charge it to an opposite or different potential. Cleaning means to remove foreign particles from the surface may also be employed as may other means of regenerating or refurbishing the cylinder surface.

What is claimed is:

1. In the art of xerography wherein an electrostatic latent image is formed on a support surface and is developed with oppositely electrostatically charged developing material, the method of developing such an image which comprises impregnating a brush having a fibrous surface with powdered developing material, electrostatically charging the developing material particles on the brush fibers to a polarity opposite to that on the electrostatic latent image, and applying the powder-impregnated brush to the electrostatic latent image on the support surface with a brushing or stippling action, thereby to deposit developing material particles on the latent image.

2. In the art of xerography wherein an electrostatic latent image is formed on a support surface and is developed with oppositely electrostatically charged developing material, the method of developing such an image which comprises impregnating a brush having a fibrous surface with powdered developing material, agitating the brush fibers to place an electrostatic charge on the developing material particles, said charge being opposite to that on the electrostatic latent image, and applying the powder-impregnated brush to the electrostatic latent image on the support surface with a brushing or stippling action, thereby to deposit developing material particles on the latent image.

3. In the art of xerography wherein an electrostatic latent image is formed on a support surface and is developed with oppositely electrostatically charged developing material, the method of developing such an image which comprises impregnating a brush having a fibrous surface with powdered developing material, agitating the brush fibers to place an electrostatic charge on the developing material particles, said charge being opposite to that on the electrostatic latent image, effecting relative movement of the support surface and the brush, and applying the powder-impregnated brush to the electrostatic latent image on the support surface with a brushing or stippling action, thereby to deposit developing material particles on the latent image.

4. In a xerographic reproducing device in which an electrostatic latent image of copy to be reproduced is formed on a support surface, an apparatus for developing such electrostatic latent image comprising a brush element having a fibrous surface, means for supporting the brush element adjacent a support surface having an electrostatic latent image thereon, means for impregnating the brush element with a powdered developing material, means for forming an electrostatic charge on the powder particles of the developing material on the brush element, said charge being opposite to that on the electrostatic latent image, and means for moving the brush element into and out of surface contact with the support surface, thereby to deposit developing material particles on the latent image.

5. In a xerographic reproducing device in which an electrostatic latent image of copy to be reproduced is formed on a support surface, an apparatus for developing such electrostatic latent image comprising a brush element having a fibrous surface, means for supporting the brush element adjacent a support surface having an electrostatic latent image thereon, means for impregnating the brush element with a powdered developing material, means for agitating the brush fibers to form an electrostatic charge on the powder particles of the developing material on the brush element, said charge being opposite to that on the electrostatic latent image, means for moving the brush element into and out of surface contact with the support surface, and means for moving the brush element for placing successive portions thereof in position to contact the support surface, thereby to deposit developing material particles on the latent image.

6. In a xerographic reproducing device in which an electrostatic latent image of copy to be reproduced is formed on a support surface, an apparatus for developing such electrostatic latent image comprising a brush element having a fibrous surface, means for supporting the brush element for rotation about an axis parallel to the plane of the support surface and in spaced relation thereto, means for rotating the brush element relative to the support surface, means for impregnating the brush element with powdered developing material, and means operable concomitantly for oscillating the brush element into and out of surface contact with the support surface, thereby to deposit developing material on the electrostatic latent image.

7. In a xerographic reproducing device in which an electrostatic latent image of copy to be reproduced is formed on a support surface, an apparatus for developing such electrostatic latent image comprising a brush element having a fibrous surface, means for supporting the brush element for rotation about an axis parallel to the plane of the support surface and in spaced relation thereto, means for rotating the brush element relative to the support surface, means for impregnating the brush element fibers with powdered developing material, means for agitating the brush element fibers for electrostatically charging the developing material thereon oppositely to the charge on the electrostatic latent image, and means operable concomitantly for oscillating the brush element into and out of surface contact with the support surface, thereby to deposit developing material particles on the latent image.

8. The method of developing latent electrostatic charge images on a record receiving member comprising the steps of applying a substantially uniform distribution of electroscopic developer powder to a substantially cylindrical brush having a fibrous surface capable of retaining, through an attractive force, a quantity of said powder thereon, charging said powder, rotating the fibrous surface of said brush in contact with the surface of a record receiving member bearing a latent electrostatic charge image, and transferring portions of said developer powder to areas of said record receiving member corresponding to said charge image during said contact through an electrostatic attractive force established by said charge image which is greater than said first mentioned attractive force.

9. A xerographic printer comprising a rotatable drum and a cylindrical electroplate mounted thereon for rotation therewith, said electroplate having a peripheral outer surface adapted for having latent electrostatic images formed thereon; means for developing said images and forming a developing station along the path of travel of said electroplate surface including a movable fur brush having fibers movable in contact with said surface, and means for applying a quantity of electroscopic toner powder to the fibers of said brush; means for moving said electroplate whereby said surface advances at a continuous rate past said developing station; and means for effecting a relative movement of said brush to effect a series of separate, overlapping gentle, wiping actions of said brush over the entire surface of said electroplate surface including means for moving said brush in the direction of said surface advance and relative to said surface and for moving said brush radially during said brush movement into and out of physical contact with said electroplate surface.

10. A xerographic printer comprising a rotatable drum having a cylindrical xerographic plate mounted thereon,
said drum being mounted for rotation about a substantially horizontal axis,
said xerographic plate having a peripheral outer surface adapted for having an electrostatic latent image formed thereon,
means for developing said image and forming a developing station along the path of travel of said xerographic plate surface including a substantially cylindrical fur brush,
said brush being mounted for rotation about an axis substantially parallel to the axis of the rotatable drum, the axes of said drum and brush being spaced so that the ends of the fur brush fibers are in contacting relation with the xerographic plate surface,
means for applying a quantity of powdered developing material to the fibers of the brush,
means for rotating said drum whereby said xerographic plate surface moves past the developing station, and
means operable concomitantly for effecting rotating movement of the fur brush whereby the tips of the brush fibers are brought successively into contacting relation with the xerographic plate surface.

11. In a xerographic reproducing device in which an electrostatic latent image of copy to be reproduced is formed on a support surface, an apparatus for developing such electrostatic latent image comprising a brush element having a fibrous surface, means for supporting the brush element adjacent a support surface containing the electrostatic latent image, means for impregnating the brush element with a powdered developing material, said fibrous surface adapted to hold thereon by electrostatic attraction powdered material during impregnation and adapted to release said powdered material for development of an electrostatic latent image, and means for effecting relative motion of the brush element and the support surface with the brush element in surface contact with the support surface, thereby to deposit developing material on the latent image.

12. An electrostatic latent image developing apparatus as defined in claim 11 wherein the fibers of the brush element are metallic.

References Cited by the Examiner

UNITED STATES PATENTS

| | | | |
|---|---|---|---|
| 62,044 | 2/1867 | Lowe | 118—109 X |
| 1,552,788 | 9/1925 | Whittaker | 95—1.3 |
| 1,706,182 | 3/1929 | Pipkin | 117—18 XR |
| 1,723,206 | 8/1929 | Pino | 118—241 |
| 1,784,912 | 12/1930 | Scott | 95—1.9 |
| 1,956,820 | 5/1934 | Bergstein | 118—241 XR |
| 2,221,776 | 11/1940 | Carlson | 117—17.5 X |
| 2,297,691 | 10/1942 | Carlson | 95—1.3 |
| 2,357,809 | 9/1944 | Carlson | 95—1.9 |
| 2,368,648 | 2/1945 | Dulken et al. | 118—241 X |
| 2,618,551 | 11/1952 | Walkup | 117—17.5 |
| 2,618,552 | 11/1952 | Wise | 117—17.5 |
| 2,624,652 | 1/1953 | Carlson | 95—1.3 XR |
| 2,633,796 | 4/1953 | Pethick | 95—1.9 |
| 2,732,775 | 1/1956 | Young et al. | 117—17.5 |
| 2,811,465 | 10/1957 | Greig | 117—17.5 |

WILLIAM D. MARTIN, *Primary Examiner.*

PHILIP E. MANGAN, RICHARD D. NEVIUS,
*Examiners.*